Patented May 29, 1945

2,377,197

UNITED STATES PATENT OFFICE 2,377,197

PROCESS FOR THE PRODUCTION OF ACETONE AND BUTYL ALCOHOL BY FERMENTATION

Charles Weizmann, London W. C. 1, England

No Drawing. Application March 2, 1942, Serial No. 433,092. In Great Britain March 11, 1941

3 Claims. (Cl. 195—45)

This invention relates to processes for the production of acetone and butyl alcohol by fermentation, namely, by the fermentation of molasses, which may be cane sugar molasses or beet sugar molasses or mixtures thereof. Many processes have been proposed or used for this purpose, which, as well as the great number of patents concerned with the fermentative conversion of molasses into acetone and butyl alcohol, is in itself proof of the inherent difficulties of the matter. All earlier processes seem to have a defect of some character, perhaps partly due to their technical imperfection, and partly also to the fact that the underlying assumptions on the cause of the difficulties are very often erroneous.

It has, for example, frequently been suggested that the addition of protein to molasses removes the difficulties. By the proteolytic enzymes of the concerned micro-organisms, the protein is degraded into amino-acids which act both as nutrient for the bacteria and buffer the mash so as to counteract the destructive effect on the bacteria of the acids which are invariably formed as minor by-products in the acetone-butyl alcohol fermentation. The addition of protein to molasses has, however, proved insufficient to overcome the difficulties of fermentation, and a scrutiny of the patent literature appears to reveal the same fact. In U. S. A. Patent No. 1,992,921, in addition to the use of protein, hydrolysis of the sucrose in the molasses, previous to its fermentation, as recommended, but even under these conditions the fermentation of a molasses sugar solution as dilute as 3% is incomplete, and from a theoretical viewpoint, the suggestion that hydrolysis improves the fermentability is in contradiction with the fact that the acetone-butyl alcohol producing organisms attack sucrose as well as the monosaccharides as they contain saccharase. In U. S. A. Patent No. 1,510,526, the addition of corn meal as protein source is considered insufficient, as in addition a previous purification by means of charcoal is recommended.

The common practice of fermenting a molasses mash is to inoculate it with a relatively very small amount of a fermenting or fermented mash, the propagation of the bacteria taking place in the molasses mash. This method is described in my prior British patent, No. 496,137. It has, however, been proposed to use mass inoculation for the conversion of molasses in the neutral solvents in U. S. A. Patent No. 1,911,411.

This term "mass inoculation" means the inoculation of say the molasses mash with a fermenting mash containing fermentable carbohydrate in amount of the same magnitude as present in the molasses mash. In the former case the propagation of the bacteria takes place almost entirely in the molasses mash, whereas in the latter the molasses mash is inoculated with an actively fermenting culture.

The object of the present invention is to provide an improved process for the production of acetone and butyl alcohol by the fermentation by acetone and butyl alcohol producing bacteria, of molasses, utilising the mass inoculation principle, and, mainly from the aspects of enabling with such inoculation, molasses mashes of high sugar content, for instance up to 10% sugar to be fermented, and these fermented to a high degree of exhaustion of the sugar, namely, to a remaining unfermented sugar content of about 1% to 2% of the original sugar concentration, the molasses being ordinarily natural molasses, that is to say there being no need to purify them in any way either by means of charcoal or otherwise (cf. U. S. A. Patent No. 1,510,526), or to add protein (cf. U. S. A. Patent No. 1,911,411), or to treat the molasses in any way prior to fermentation.

The invention consists in a process for the production of acetone and butyl alcohol by the fermentation of a molasses mash by acetone and butyl alcohol producing bacteria, for instance *Clostridium acetobutylicum*, which comprises the fermentation by such bacteria of rice bran which contains protein and starch or lower-molecular sugar, the quantity of bran being chosen so that the amount of fermentable carbohydrate is between about half and about twice the sugar content of the molasses to be fermented, and after this fermentation has proceeded vigorously incorporating the fermenting mash with the raw molasses to be fermented, and continuing the fermentation of the mash as a whole until substantial exhaustion of the fermentable carbohydrate has been effected.

The invention also consists in processes for the production of acetone and butyl alcohol substantially as hereinafter described.

The following examples illustrate how the invention may be carried into effect:

*Example 1*

100 parts rice bran in 900 parts water were heated for 2 hours at 120° C., and then inoculated with a culture of *Clostridium acetobutylicum*, which started fermentation after 6 hours. 24 hours after the inoculation, the mash, still actively fermenting, was poured out into a sterile solution of 60 parts sugar (in form of a 6% solution, prepared from black-strap molasses). After 48 hours the fermentation had practically subsided, and 47.2 liters of gas had been formed. The filtered reaction product contained 2.6 parts non-fermented sugar, 28.8 parts neutral solvent, and 4.6 parts acids (calculated as acetic acid). Calculated on the starch plus sucrose plus monosaccharides content of the starting material (82.5 parts), the "theoretical" amount of reaction products should have been 27.5 parts; the excess (5.9 parts) over that amount is due to the fact that part of the cellulosic and hemicellulosic material of the bran had also been fermented.

Example 2

A fermenting rice bran mash, prepared as in Example 1, was poured out after 24 hours into a sterile solution of 28 parts sugar (in form of a 5.6% solution, prepared from black-strap molasses), and after 15 hours the whole fermenting mass was added to 60 parts sugar (in form of a 6% solution as above). After 48 hours the fermentation was finished, and the filtered reaction product was found to contain 1.7 parts of unfermented sugar, 34 parts neutral solvents (of which 32.9 parts were acetone), and 5.1 parts acids (calculated as acetic acid). Again, the total amount of fermentation products (39.1 parts) is higher than a third of starch, sucrose and monosaccharides (110.5 parts).

Example 3

Mass inoculation of 100 parts fermenting rice bran into 70 parts sugar (in form of a 7% solution as in previous examples caused a vigorous fermentation, lasting for 48 hours and leaving 3.6 parts sugar non-fermented. The neutral solvents amounted to 27.4 parts, the acids (calculated as acetic acid) to 11.5 parts, so that the total products (38.9 parts) make 42% of the sum of starch, sucrose and monosaccharides subjected to the fermentation. The relatively high amount of acids formed shows the high buffering power of the rice bran protein, or more exact, of its degradation products.

Example 4

Mass inoculation of 100 parts actively fermenting rice bran into 100 parts sugar (in form of a 10% solution, prepared as above) caused the fermentation to last 4 days and to leave 3.5 parts sugar non-fermented. The amount of neutral solvents formed was 28.5 parts, the amount of acids, calculated as acetic acid, 4.8 parts. In this example the constitution of the acids formed was determined by the method of Duclaux-Richmond. They consisted of 83% acetic acid and 17% higher fatty acids.

Example 5

In this example the fermentability of glucose was tested, and at the same time the proteolytic power of the organism towards the rice bran protein determined (the rice bran mash contained 10.0% protein). An actively fermenting mash, prepared from 100 parts rice bran in 900 parts water and an inoculum of Clostridium acetobutylicum, was poured 18 hours after inoculation, into a sterile solution of 70 parts glucose in 700 parts water. The reaction subsided in 48 hours, and had produced 32.2 parts neutral solvents, while 2.7 parts reducing sugar were left unfermented. Of the 10 parts protein contained in the rice bran, 6.3 parts had passed into solution, and of this, 2.1 parts were degraded to the state of amino-acids.

General

In the above examples, rice bran has been used as a cereal. I have found that rice bran possesses special features as an initiator of molasses fermentation. Its protein is easily degraded by Clostridium acetobutylicum, the amino-acids formed are an especially suitable nutrient for the organism, and the rice bran also contains a system of activating substances which are necessary for the development and metabolism of the bacteria. In this connection attention may be drawn to the fairly high vitamin $B_1$ content of the bran (280 units in 100 parts; Leong, Chemical Abstracts 34, 7019, 1940). It may also be mentioned that rice bran is a waste product of agricultural industry—its price is therefore suitably low. It has a reasonable starch content, which starch is fermented in the process, and increases the total yield in acetone and butyl alcohol.

In the process described it is, however, not only the starch of the rice bran which is fermented, but, as dealt with more fully in my copending application Serial Number 433,093, corresponding to British application No. 4858/41, the fermentative attack extends to part of the hemicellulosic material (rice bran contains 6.5% pentosans). In other words, under the conditions used, not only the starch of the rice bran, but also part of the cellulosic and hemicellulosic constituents are fermented, which is a novel feature for Clostridium acetobutylicum. The yield in reaction products is therefore higher than the expected usual 33% of the sum of starch (from the bran) and sucrose and monosaccharides (from the molasses).

By the process described above it is possible to ferment to practical completion a molasses solution containing as much as 10% total sugar. After the addition of the initiating mash in the proportion stated, the total reaction mixture may have a fermentable carbohydrate content of 7%, which is fermented within 24 to 48 hours, giving mainly a mixture of acetone and butyl alcohol in the ratio 1:2, accompanied by minor amounts of ethyl alcohol and acids, which consist of butyric and acetic acid. It is therefore an advance on the process of United States Patent No. 1,911,411 employing mass inoculation where it was apparently not possible to ferment molasses sugar solutions containing more than 4% to 6½% of sugar. This does not mean the total concentration of fermentable carbohydrate (such as starch, sucrose, glucose, fructose) in the mash, but the sugar concentration in the molasses solution, which is diluted by the addition of the initiating mash. Further, the total monosaccharides of the molasses remained unfermented, while in the process of the present application they are fermented practically to exhaustion. It also avoids the necessity for adding protein to the molasses, and gives, as indicated, practically exhaustion of fermentable sugar.

The above-mentioned neutral solvents and fatty acids are not the only valuable products of this process. The concerned bacteria synthetize vitamin $B_2$ in the course of their metabolic activities, so that the fermentation product contains considerable amounts both of vitamin $B_2$ and the vitamin $B_1$ which, as stated above, is introduced into the mash with the rice bran.

The vitamin $B_1$ and vitamin $B_2$ balance, which may be obtained according to the present invention, is illustrated in the following table:

reducing sugars which are by their structure not given to bacterial attack.

| | Test 1 | Test 2 | Test 3 | Test 4 |
|---|---|---|---|---|
| Initiator | 50 g. rice-bran, 950 cc. water. | 100 g. rice-bran, 1900 cc. water. | 100 g. rice-bran, 1900 cc. water. | 100 g. rice-bran, 1900 cc. water. |
| Sugar | 95 g. dextrose→1 litre water. | | 380 g. molasses→2 litre water. | 380 g. molasses→2 litre water 20 g. calcium carbide. |
| Total carbohydrate concentration | 6.4% | 2.5% | 6.0% | 6.0%. |
| Vitamin $B_1$ present | 148 units | 295 units | 295 units | 295 units. |
| Vitamin $B_2$ present | 155γ | 310γ | 2,172γ | 2,172γ. |
| Total volume of spent wash | 950 cc | 1,100 cc | 2,500 cc | 2,450 cc. |
| Residual sugar, grams | 5.6 | 0 | 5.9 | 6.5. |
| Residual sugar, per cent of initial | 4.4 | 0 | 2.5 | 2.7. |
| Solvents, grams | 40 | 16 | 76 | 72. |
| Solvents, per cent of sugar | 31.2 | 32.0 | 31.7 | 30.0. |
| Total solids in spent wash | 8.3 g | 16.5 g | 167 g | 131 g. |
| Vitamin $B_1$ per gram of solids | 6.1 | 2.0 | 0.7 | 0.8. |
| Vitamin $B_1$ total units | 50.3 | 53.0 | 112.5 | 107.8. |
| Vitamin $B_2$, per cent of original | 34% | 11% | 38% | 37%. |
| Vitamin $B_2$ per gram of solids | 263 | 160 | 36 | 39. |
| Vitamin $B_2$, total units | 2,165 | 2,640 | 6,000 | 5,145. |
| Nitrogen in solution per cent of original | 1,410 | 652 | 276 | 236. |
| Nitrogen in solution, total grams | 0.452 | 1.000 | 7.070 | 7.683. |
| Nitrogen in solution volatile, grams | 0 | 0 | 0.365 | 0.514. |
| Nitrogen in solution protein grams | 2.86 | 6.55 | 42.42 | 45.55 |

The following notes apply to the above table:

(1) *Materials*.—Rice bran 50% starch; vitamin $B_1$ 2.95 units and vitamin $B_2$ 3.1 γ per gram. Molasses 50% sugar; vitamin $B_1$ none; vitamin $B_2$ 4.9 γ per gram.

(2) In each case a third of the liquid was distilled off so as to determine the solvents formed. All the other determinations have been made on the remaining spent wash.

(3) Volatile acids formed have not been determined.

(4) Volatile nitrogen represents the compounds in the spent wash which give ammonia (or volatile amines) on direct treatment with sodium hydroxide solution.

(5) The "proteins" have been calculated in the usual way from the non-volatile nitrogen. It is obvious that other substances are included in these figures.

From the aforesaid table the following facts emerge: Vitamin $B_1$ which is known for some time as activator for the Weizmann fermentation and which is mainly supplied by the rice bran acting as initiators is partly destroyed during the fermentation. In spite of that the spent wash is still unusually rich in this vitamin. Vitamin $B_2$ is synthesized by the bacterium itself, and its quantities in the spent wash are 2.5–5.5 times greater than in the original mash. The spent wash, e. g. after evaporation, is therefore a rich source of the two vitamins, and especially in view of its high amino-acid content, of importance for the production of foodstuff.

The products of the fermentation are as usual acetone, ethyl alcohol and butyl alcohol. The amount of ethyl alcohol is rather constantly 8% of the neutral solvents formed. Acetone forms 28%–32%, and the remainder is constituted by butyl alcohol.

The maximum concentration of neutral solvents in the product which can be reached is about 2.1%. This corresponds to a total carbohydrate concentration in the original mash of 6.3%. Higher concentrations can also be fermented, but in this case the absolute amount of neutral solvents does not increase. Evidently abnormal fermenation products are formed. A certain amount of reducing sugar remains unfermented, its quantity varying with the sample of molasses used. This is apparently due to the fact that molasses contain varying quantities of reducing sugars which are by their structure not given to bacterial attack.

The importance, according to the present invention, of mass inoculation is emphasized. It may be well to explain briefly the difference between mass inoculation and the usual inoculation. For this purpose it may be assumed that the difficult fermentability of molasses is due to two factors, the lack of degradable protein and the presence of toxic substances. If one inoculates with the usual relatively small inoculum molasses mash containing rice bran, one has sufficient protein, but the concentration of toxic substances is so great that the relatively small number of bacteria added is very quickly inactivated, and no proper fermentation can take place. If the rice bran, i. e. relatively a large quantity, is first brought into active fermentation, and then used as mass inoculum, one has from the beginning protein already in degraded state (amino-acids), and the number of bacteria is from the beginning so large that at least part of them has a fair chance to survive the attack of the poisonous substance.

I claim:

1. In the production of acetone and butyl alcohol, the process which comprises fermenting, by acetone and butyl alcohol producing bacteria, a quantity of rice bran sufficient in amount so that the fermentable carbohydrate present is between about half and about twice the sugar content of the molasses to be fermented, and, after this fermentation has proceeded vigorously, incorporating the fermenting mash into the raw molasses to be fermented, and continuing the fermentation of the mass as a whole until substantial exhaustion of the fermentable carbohydrate has been effected.

2. In the production of acetone and butyl alcohol, the process which comprises fermenting, by *Clostridium acetobutylicum*, a quantity of rice bran sufficient in amount so that the fermentable carbohydrate present is between about half and about twice the sugar content of the molasses to be fermented, and, after this fermentation has proceeded vigorously, incorporating the fermenting mash into the raw molasses to be fermented, and continuing the fermentation of the mass as a whole until a substantial exhaustion of the fermentable carbohydrate has been effected.

3. The process of claim 1 wherein the raw molasses to be fermented is a solution containing up to 10 per cent of total sugar.

CHARLES WEIZMANN.